(12) United States Patent
Zimmermann

(10) Patent No.: US 8,372,184 B2
(45) Date of Patent: Feb. 12, 2013

(54) COMPOSITE HYDROGEN STORAGE MATERIAL AND METHODS RELATED THERETO

(75) Inventor: Joerg Zimmermann, Vancouver (CA)

(73) Assignee: Societe BIC, Clichy (FR)

( * ) Notice: Subject to any disclaimer, the term of this patent is extended or adjusted under 35 U.S.C. 154(b) by 378 days.

(21) Appl. No.: 12/727,729

(22) Filed: Mar. 19, 2010

(65) Prior Publication Data

US 2010/0187468 A1 Jul. 29, 2010

Related U.S. Application Data

(63) Continuation-in-part of application No. 11/379,970, filed on Apr. 24, 2006, now Pat. No. 7,708,815.

(60) Provisional application No. 60/673,859, filed on Apr. 22, 2005.

(51) Int. Cl.
*B01D 59/26* (2006.01)

(52) U.S. Cl. .......... 96/108; 96/154; 95/90; 95/148; 502/526; 429/515; 429/516; 423/658.2

(58) Field of Classification Search .......... 96/108–154; 95/90–148, 900–903; 420/900; 206/0.7; 423/248, 648.1, 658.2; 55/524
See application file for complete search history.

(56) References Cited

U.S. PATENT DOCUMENTS

| | | | |
|---|---|---|---|
| 3,703,976 A | 11/1972 | Hughes et al. | |
| 4,110,425 A | 8/1978 | Buhl et al. | |
| 4,134,491 A | 1/1979 | Turillon et al. | |
| 4,249,654 A | 2/1981 | Helversen | |
| 4,360,569 A * | 11/1982 | Steyert et al. | 428/566 |
| 4,583,638 A | 4/1986 | Bernauer et al. | |
| 4,600,525 A * | 7/1986 | Baker et al. | 420/443 |
| 4,607,826 A | 8/1986 | Ron | |
| 4,799,360 A * | 1/1989 | Retallick et al. | 62/46.1 |
| 5,360,461 A | 11/1994 | Meinzer | |
| 5,512,087 A | 4/1996 | Varner et al. | |
| 5,527,638 A | 6/1996 | Kinoshita et al. | |
| 5,841,043 A | 11/1998 | Nishimura et al. | |
| 6,143,052 A | 11/2000 | Kiyokawa et al. | |
| 6,267,229 B1 | 7/2001 | Heung | |
| 6,306,339 B1 | 10/2001 | Kiyokawa et al. | |
| 6,444,016 B2 * | 9/2002 | Oshima et al. | 96/111 |
| 6,520,219 B2 | 2/2003 | Shapovalov et al. | |
| 6,596,055 B2 | 7/2003 | Cooper et al. | |
| 6,620,225 B2 | 9/2003 | Wang et al. | |
| 6,627,229 B2 | 9/2003 | Kikuchi et al. | |
| 6,638,348 B2 | 10/2003 | Kuriiwa et al. | |
| 7,323,043 B2 | 1/2008 | Finamore | |

(Continued)

FOREIGN PATENT DOCUMENTS

| | | |
|---|---|---|
| IN | 251898 | 4/2012 |
| JP | 59-147032 A | 8/1984 |

(Continued)

OTHER PUBLICATIONS

"U.S. Appl. No. 12/052,848, Final Office Action mailed Jun. 4, 2012", 12 pgs.

(Continued)

*Primary Examiner* — Jason M Greene
*Assistant Examiner* — Dung H Bui
(74) *Attorney, Agent, or Firm* — Schwegman Lundberg & Woessner, P.A.

(57) ABSTRACT

Embodiments of the invention relate to a composite hydrogen storage material comprising active material particles and a binder, wherein the binder immobilizes the active material particles sufficient to maintain relative spatial relationships between the active material particles.

16 Claims, 5 Drawing Sheets

U.S. PATENT DOCUMENTS

| | | | |
|---|---|---|---|
| 7,404,842 | B1 | 7/2008 | Wainright et al. |
| 7,563,305 | B2 | 7/2009 | Zimmermann |
| 7,708,815 | B2 | 5/2010 | Zimmermann |
| 2003/0126991 | A1 | 7/2003 | Wang et al. |
| 2003/0209147 | A1 | 11/2003 | Myasnikov et al. |
| 2004/0065171 | A1 | 4/2004 | Hearley et al. |
| 2004/0089151 | A1 | 5/2004 | Wang et al. |
| 2004/0178083 | A1 | 9/2004 | Yang et al. |
| 2004/0231823 | A1 | 11/2004 | Tsuji |
| 2004/0265670 | A1 | 12/2004 | Muller et al. |
| 2005/0022883 | A1 | 2/2005 | Adams et al. |
| 2005/0025921 | A1 | 2/2005 | Finamore |
| 2005/0036941 | A1 | 2/2005 | Bae et al. |
| 2005/0241479 | A1 | 11/2005 | Lebowitz et al. |
| 2006/0021882 | A1* | 2/2006 | Kaye et al. ............ 206/0.6 |
| 2006/0086125 | A1 | 4/2006 | Sueoka et al. |
| 2006/0169144 | A1 | 8/2006 | Forslund |
| 2006/0188717 | A1* | 8/2006 | Kambara et al. ............ 428/367 |
| 2006/0237688 | A1 | 10/2006 | Zimmermann |
| 2006/0248921 | A1 | 11/2006 | Hosford et al. |
| 2007/0166586 | A1 | 7/2007 | Marchand et al. |
| 2007/0295617 | A1 | 12/2007 | Zimmermann |
| 2008/0233460 | A1 | 9/2008 | Zimmermann et al. |
| 2009/0255831 | A1 | 10/2009 | Zimmermann |

FOREIGN PATENT DOCUMENTS

| | | | |
|---|---|---|---|
| JP | 59219429 | A | 12/1984 |
| JP | 63-147801 | A | 6/1988 |
| JP | 01-246101 | A | 10/1989 |
| JP | 05-235575 | | 9/1993 |
| JP | 11-050169 | A | 2/1999 |
| WO | WO-2006/111005 | A1 | 10/2006 |
| WO | WO-2007/147260 | A1 | 12/2007 |

OTHER PUBLICATIONS

"U.S. Appl. No. 12/052,848, Response filed May 14, 2012 to Non Final Office Action mailed Jan. 4, 2012", 11 pgs.

"Canadian Application Serial No. 2605695, Office Action mailed May 1, 2012", 3 pgs.

"European Application Serial No. 2605695, Office Action mailed May 3, 2012 to Extended Search Report mailed Oct. 18, 2011", 6 pgs.

"Japanese Appiication Serial No. 2008-506893, Office Action mailed Feb. 7, 2012", 9 pgs.

"Korean Application Serial No. 10-2007-7027181, Trial Decision mailed Feb. 17, 2012", EN Translation Only, 4 pgs.

"U.S. Appl. No. 12/052,848 , Response filed Aug. 21, 2012 to Final Office Action mailed Jun. 4, 2012", 9 pgs.

"Korean Application Serial No. 10-2007-7027181, Office Action Received mailed Oct. 26, 2009", 1 pg.

"U.S. Appl. No. 11/379,970, Non-Final Office Action mailed Jan. 29, 2009", 16 pgs.

"U.S. Appl. No. 11/379,970, Final Office Action mailed Jun. 23, 2009", 16 pgs.

"U.S. Appl. No. 11/379,970, Notice of Allowance mailed Dec. 22, 2009", 7 pgs.

"U.S. Appl. No. 11/379,970, Preliminary Amendment mailed Dec. 20, 2007", 15 pgs.

"U.S. Appl. No. 11/379,970, Response filed Apr. 29, 2009 to Non Final Office Action mailed Jan. 29, 2009", 14 pgs.

"U.S. Appl. No. 11/379,970, Response filed Oct. 23, 2009 to Final Office Action mailed Jun. 23, 2009", 18 pgs.

"U.S. Appl. No. 11/473,591, Non-Final Office Action mailed Oct. 9, 2008", 8 pgs.

"U.S. Appl. No. 11/473,591, Notice of Allowance mailed Mar. 16, 2009", 8 pgs.

"U.S. Appl. No. 11/473,591, Response filed Jan. 9, 2009 to Non Final Office Action mailed Oct. 9, 2008", 16 pgs.

"U.S. Appl. No. 12/052,848, Final Office Action mailed Feb. 26, 2010", 11 pgs.

"U.S. Appl. No. 12/052,848, Non-Final Office Action mailed Aug. 28, 2009", 9 pgs.

"U.S. Appl. No. 12/052,848, Response filed Apr. 27, 2009 to Restriction Requirement mailed Mar. 27, 2009", 7 pgs.

"U.S. Appl. No. 12/052,848, Response filed Dec. 17, 2009 to Non Final Office Action mailed Aug. 28, 2009", 11 pgs.

"U.S. Appl. No. 12/052,848, Restriction Requirement mailed Mar. 27, 2009", 8 pgs.

"International Application Serial No. PCT/CA2006/000588, International Search Report mailed Sep. 5, 2006", 3 pgs.

"International Application Serial No. PCT/CA2006/000588, Written Opinion mailed Sep. 5, 2006", 6 pgs.

"International Application Serial No. PCT/CA2007/001129, International Search Report mailed Oct. 19, 2007", 3 pgs.

"International Application Serial No. PCT/CA2007/001129, Written Opinion mailed Oct. 19, 2007", 5 pgs.

"Korean Application No. 10-2007-7027181, Office Action Mailed Apr. 28, 2009", 1 pg.

"Canadian Application No. 2,605,695, Office Action mailed Jun. 22, 2009", 3 pgs.

Schmidt, W, R., et al., "Hydrogen Storage in Polymer-dispersed Metal Hydrides (PDMH)", *Proceedings of the 2001 DOE Hydrogen Program Review*, (NREL/CP-470-30535), (2001), 14 pgs.

Shih, R. J, et al., "Self-supported electrodes made of LaNi4.25Al0.15Co0.5V0.1 and Ag or Ni hydrogenation", *International Journal of Hydrogen Energy*, vol. 31, 2006 , 1716-1720.

Zuttel, Andreas, "Materials for hydrogen storage", *Materialstoday*, (2003), 24-33.

"U.S. Appl. No. 12/052,848, Advisory Action mailed Aug. 9, 2010", 3 pgs.

"U.S. Appl. No. 12/052,848, Examiner Interview Summary mailed Dec. 22, 2009", 3 pgs.

"U.S. Appl. No. 12/052,848, Examiner Interview Summary mailed Jul. 26, 2010", 4 pgs.

"U.S. Appl. No. 12/052,848, Notice of Non-Compliant Amendment mailed Jun. 12, 2009", 2 pgs.

"U.S. Appl. No. 12/052,848, Response filed Jun. 17, 2009 to Notice of Non-Complaint mailed Jun. 12, 2009", 6 pgs.

"U.S. Appl. No. 12/052,848, Response filed Jul. 26, 2010 to Final Office Action mailed Feb. 26, 2010", 11 pgs.

"U.S. Appl. No. 12/052,848, Response filed Jan. 21, 2010 to Examiner Interview Summary mailed Dec. 22, 2009", 1 pg.

"Canadian Application Serial No. 2,605,695, Amendment filed Jan. 6, 2011 to Office Action mailed Jul. 6, 2010", 12 pgs.

"Canadian Application Serial No. 2,605,695, Office Action mailed Jul. 6, 2010". 3 pgs.

"Canadian Application Serial No. 2,605,695, Response and Amendment filed Dec. 22, 2009 to Office Action mailed Jun. 22, 2009", 21 pgs.

"Chinese Application Serial No. 200680021474.8, Office Action mailed Apr. 22, 2010", 7 pgs.

"Chinese Application Serial No. 200680021474.8, Response filed Sep. 6, 2010 to Office Action mailed Apr. 22, 2010", (w/ English Translation of Claims), 12 pgs.

"Japanese Application Serial No. 2008-506893, Office Action mailed Jan. 18, 2011", 6 pgs.

"Korean Application Serial No. 10-2007-7027181, Amendment filed Feb. 24, 2010", (w/ English Translation of Amended Claims), 23 pgs.

"Korean Application Serial No. 10-2007-7027181, Amendment filed Jun. 29, 2009 to Office Action mailed Apr. 28, 2009", (w/ English Translation of Claims), 38 pgs.

"Korean Application Serial No. 10-2007-7027181, Appeal Brief filed Mar. 24, 2010", 36 pgs.

"Korean Application Serial No. 10-2007-7027181, Office Action mailed Apr. 28, 2009", (w/ Summary), 6 pgs.

"Singapore Application Serial No. 200717077-2, Invitation to Response to Written Opinion mailed Mar. 25, 2010", 5 pgs.

"Singapore Application Serial No. 200717077-2, Response filed Aug. 25, 2010 to Office Action and Written Opinion mailed Mar. 25, 2010", 11 pgs.

"U.S. Appl. No. 12/052,849, Non Final Office Action mailed Jun. 10, 2011", 11 pgs.

"Canadian Application Serial No. 2,805,695 Office Action mailed Jul. 20, 2011", 2 pgs.

"Indian Application Serial No. 8079/DELNP/2007, First Examiner Report mailed Apr. 18, 2011", 3 pgs.

"Japanese Application Serial No. 2008-506893, Response filed Apr. 15, 2011 to Office Action mailed Jan. 18, 2011", (w/ English Translation of Amendments), 13 pgs.

"Singapore Application Serial No. 200717077-2, Examination Report mailed May 27, 2011". 5 pgs.

"U.S. Appl. No. 12/052,848, Response filed Nov. 7, 2011 to Non Final Office Action mailed Jun. 10, 2011", 14 pgs.

"European Application Serial No. 06721830.5, Supplementary European Search Report mailed Oct. 18, 2011", 7 pgs.

"Korean Application Serial No. 10-2010-7004120, Office Action mailed Jun. 13, 2011", (w/English Summary), 7 pgs.

"Korean Applicaiton Serial No. 10-2010-700120, Response filed Nov. 14, 2011 to Office Action mailed Jun. 13, 2011", (w/ English Translation of Amended Claims), 28 pgs.

"U.S. Appl. No. 12/052,848, Non Final Office Action mailed Jan. 4, 2012", 13 pgs.

"Canadian Application Serial No. 2605695, Amendment filed Jan. 20, 2012 in response to Office Action mailed Jul. 20, 2011", 11 pgs.

"Indian Application Serial No. 8079/DELNP/2007, Response filed Dec. 16, 2011 to Office Action mailed Apr. 18, 2011", 4 pgs.

* cited by examiner

US 8,372,184 B2

COMPOSITE HYDROGEN STORAGE MATERIAL AND METHODS RELATED THERETO

PRIORITY OF INVENTION

This application is a continuation-in-part application of U.S. patent application Ser. No. 11/379,970, which was filed on Apr. 24, 2006, and issued as U.S. Pat. No. 7,708,815 and which claims the benefit of priority under 35 U.S.C. §119(e) to U.S. Provisional Patent Application Ser. No. 60/673,859, filed Apr. 22, 2005, which applications are incorporated herein by reference in their entirety.

TECHNICAL FIELD

Embodiments of the present invention relate to a composite hydrogen storage material. Specifically, embodiments of the present invention relate to a composite hydrogen storage material for occluding and desorbing hydrogen.

BACKGROUND

Conventionally, hydrogen may be stored in the form of metal hydride powders. During the hydriding/dehydriding cycle, strain behavior causes the particle bed to become unstable, resulting in settling and compacting of the particle bed. Through repeated cycling, the three-dimensional relationship of the powder particles continues to change, causing strain to continue to increase. When using metal hydride powders, inefficient heat transfer can hamper the rate and effectiveness of the hydriding/dehydriding cycle.

When using traditional metal hydride powders, safety and handling issues arise as many materials are pyrophoric, or become pyrophoric once contacted with hydrogen. In addition, powders may be blown into the hydrogen stream, which requires complicating filtering and also introduces a pressure drop into the fuel system.

The hydriding/dehydriding process imparts strain on the storage medium causing it to expand during charging and contract during discharge. This strain, which can be quite significant, is conventionally dealt with by designing a hydride storage vessel with expansion room to accommodate the strain. However, the unstable nature of the particle bed causes the packing of hydride material, effectively filling up the expansion room and causing significant strain to be exerted on the walls of the storage vessel. Therefore, the storage vessel must be designed to deal with this internally induced mechanical strain, either by increasing wall thickness or developing a system of internal structures to cause the bed to 'unpack' itself when straining occurs. The need for these complicated designs of a storage vessel effectively reduces the volumetric hydrogen storage density of the metal hydride powders.

The hydriding/dehydriding process causes the powder particles to pack more tightly, thus increasing the compaction of the system. The three-dimensional relationship of the particles changes throughout the hydriding/dehydriding cycle, negatively affecting the hydrogen storage ability of the powder.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
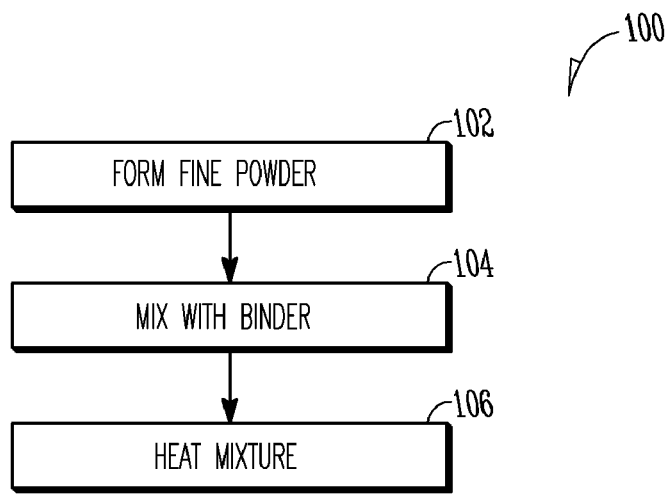
FIG. 1 illustrates a block flow diagram of a method of making a composite hydrogen storage material, according to some embodiments of the invention.

Embodiments of the invention relate to a composite hydrogen storage material comprising active material particles and a binder, wherein the binder immobilizes the active material particles sufficient to maintain relative spatial relationships between the active material particles. Further, embodiments relate to a hydrogen storage system comprising a storage vessel, a composite hydrogen storage material disposed in the storage vessel, wherein the composite hydrogen storage material comprises active material particles and a binder, wherein the binder immobilizes the active material particles sufficient to maintain relative spatial relationships between the active material particles and at least one port for communicating with an external device.

Embodiments of the invention relate to a method for making a composite hydrogen storage material comprising forming a fine powder of active material particles, mixing a binder with the fine powder to provide a mixture and heating the mixture sufficient to form a composite hydrogen storage material, wherein the binder immobilizes the active material particles sufficient to maintain relative spatial relationships between the active material particles. Embodiments of the invention also relate to a method of using a composite hydrogen storage material, the method comprising occluding hydrogen onto or within a composite hydrogen storage material, wherein the composite hydrogen storage material comprises active material particles and a binder, wherein the binder immobilizes the active material particles sufficient to maintain relative spatial relationships between the active material particles and desorbing hydrogen from the composite hydrogen storage material.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive or unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention provide a composite hydrogen storage material and methods related thereto. The composite hydrogen storage material allows for the occlusion and desorption of hydrogen in which the particle bed packing traditionally caused by decrepitation during the hydriding/dehydriding cycle is reduced or eliminated. The composite hydrogen storage material comprises active material particles and a binder, wherein the binder immobilizes the active material particles sufficient to maintain relative spatial relationships between the active material particles. The composite hydrogen storage material may deform under hydriding, but substantially returns to its original shape and morphology, thus the three-dimensional relationships between the active material particles are essentially unchanged throughout multiple hydriding/dehydriding cycles.

The composite hydrogen storage material also may act as a load bearing member within a storage vessel, effectively increasing the volumetric energy storage of the vessel. By utilizing the composite hydrogen storage material of the embodiments of the invention, requirements for filtration of loose metal hydride particles in the desorbed hydrogen stream is eliminated and the traditional problems of powder compaction in metal hydride storage vessels are eliminated. The composite hydrogen storage material is more thermally conductive than traditional metal hydride powders and retains similar absorption/desorption rate and capacity limits. The use of a composite hydrogen storage material for hydrogen storage is safer than traditional metal hydride powders as there is much less risk of storage vessel rupture due to powder compaction. Further, the use of a composite hydrogen storage material for hydrogen storage may allow for better compliance with national and international regulatory laws and procedures regarding the transport of hydrogen and hydrogen storage vessels.

Definitions

As used herein, "composite hydrogen storage material" refers to active material particles mixed with a binder, wherein the binder immobilizes the active material particles sufficient to maintain relative spatial relationships between the active material particles.

As used herein, "relative spatial relationships" refers to three-dimensional relationships between particles. Such three-dimensional relationships between particles in the context of the present invention will remain substantially unchanged. For example, the distance between particles may change during the hydriding/dehydriding cycle, but the particles return to substantially the same position relative to the other particles over the course of one complete cycle. The particle structure may have, e.g., an elastic property, in that the particles may move, but maintain substantially the same three-dimensional positioning substantially relative to other particles as they move. An exemplary indicator of whether a material meets the above characteristics is a qualitative measurement based upon, e.g., the volume, packing density or porosity or a dimension (e.g. length) of the composite material over repeated cycles. As such, when length of the formed composite is used as the indicator, the length of the formed composite will be at least about 80% and not more than about 120% of the parent length measured.

As used herein, "occlude" or "occluding" or "occlusion" refers to absorbing or adsorbing and retaining a substance. Hydrogen may be the substance occluded, for example. A substance may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen may be bound physically or chemically, for example.

As used herein, "immobilize" refers to the holding of particles, such that relative spatial relationships are maintained. For example, active material particles may be immobilized, allowing them to move, but keeping the particles substantially in the same geometric relationship to one another throughout multiple hydriding/dehydriding cycles.

As used herein, "metal hydride particles" or "metal hydrides" refer to metal or metal alloy particles that are capable of forming metal hydrides when contacted with hydrogen. Examples of such metal or metal alloys are $LaNi_5$, $FeTi$, $Mg_2Ni$ and $ZrV_2$. Such compounds are representative examples of the more general description of metal hydride compounds: $AB$, $AB_2$, $A_2B$, $AB_5$ and BCC, respectively. When bound with hydrogen, these compounds form metal hydride complexes, such as $MgH_2$, $Mg_2NiH_4$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof.

As used herein, "active material particles" refer to material particles capable of storing hydrogen or to material particles that may occlude and desorb hydrogen, such as metal hydrides, for example. The active material may be a metal, metal alloy or metal compound capable of forming a metal hydride when in contact with hydrogen. For example, the active material may be $LaNi_5$, $FeTi$, a mischmetal, a mixture of metals or an ore, such as $MmNi_5$, wherein Mm refers to a mixture of lanthanides. The active material particles may occlude hydrogen by chemisorption, physisorption or a combination thereof. Active material particles may also include silicas, aluminas, zeolites, graphite, activated carbons, nanostructured carbons, micro-ceramics, nano-ceramics, boron nitride nanotubes, palladium-containing materials or combinations thereof.

As used herein, "porosity" refers to the ratio of void space in a volume to the total volume (1-volume density).

As used herein, "packing density" refers to the efficiency with which the active material is packed. Packing density is the percentage of the total composite volume that is taken up by the active material. For example, a composite with a packing density of about 50% and a porosity of about 40% would consist of about 50% active material, about 10% inactive material, such as binders or additives, and about 40% void space by volume.

As used herein, "fine powder" refers to a powder comprising particles with a small size. For example, the fine powder may substantially be comprised of particles sized below about 100 microns. The fine powder may be substantially comprised of particles sized below about 50 microns, about 10 microns, about 1 micron or about 10 nanometers, for example.

Referring to FIG. 1, a block flow diagram of a method 100 of making a composite hydrogen storage material is shown, according to some embodiments of the invention. Active material particles may be formed 102 into a fine powder. A binder may be mixed 104 with the fine powder sufficient to create a mixture. The mixture may be heated 106 sufficient to form a composite hydrogen storage material, wherein the binder immobilizes the active material particles sufficient to maintain relative spatial relationships between the active material particles.

Active material particles may be comprised of material particles that are capable of storing hydrogen or of material particles that occlude and desorb hydrogen. Metal hydrides are examples. Examples may be $LaNi_5$, FeTi, $Mg_2Ni$ and $ZrV_2$. The active material particles may form 102 a fine powder. The fine powder may be formed 102 by milling, for example chemical milling, ball milling, high energy ball milling, or jet milling, or grinding, or by atomizing liquid metals to form small particles, or combinations thereof, for example.

The fine powder may be mixed 104 with a binder, such as a thermoplastic binder. Examples of suitable binders include polypropylene, polyethylene, polyvinylidene fluoride (PVDF), hexaflouropropylene vinylidene fluoride copolymer, cross-linked copolymers, polytetrafluoroethylene (PTFE), perfluoro alkoxy (PFA), thermoplastic polyesters (for example, Nylon™). If a thermoplastic binder is used, the binder may be readily melt-processable and may have an elongation to break of at least about 20%, for example. The amount of binder may be about 50% by weight or less of the mixture. The binder may be flexible enough to withstand the charging/discharging (hydriding/dehydriding) strain, while not melting or softening during the elevated temperatures of the charging phase.

The mixture may be heated 106 to form a composite hydrogen storage material. The composite hydrogen storage material produced may have a porosity from about 0.1% to about 50%, for example. The composite hydrogen storage material may have a porosity of about 5% to about 40% or from about 15% to about 25%, for example. The packing density of the active material into the metal hydride composite may be no less than about 40%, for example. The packing density may be from about 45% to about 90%, from about 60% to about 80% or greater than about 70%, for example. Optionally, the composite hydrogen storage material may undergo pressure treatment. The compression pressure may be from about 0.2 MPa to about 1000 MPa, or from about 100 MPa to about 400 MPa. In addition, the mixture may be vibrated as well. A further step may include molding of the composite hydrogen storage material. Examples of molding include compression molding, injection molding, extrusion or combinations thereof. The composite hydrogen storage material may be molded into a specific shape, such as a prismatic shape, a pellet, a wafer, a disc, a film, a sheet, a perforated sheet, a rod or combinations thereof.

The composite hydrogen storage material can have sufficient structural strength with a proper binder to withstand the strain induced by charging and discharging the active material particles without causing the composite to fracture. Structural strength of the composite hydrogen storage material allows it to be used as a load bearing member that can resist the force exerted by the hydrogen absorbing into the metal hydride particles. Due to this ability to resist the force produced by particle strain, the composite hydrogen storage material is able to retain its structural integrity and remain as a solid during multiple occlusion and desorption cycles. The composite hydrogen storage material may be shaped as pellets, discs, spheres, wafers, rectangular wafers or any porous or geometric shape.

Optionally, the composite hydrogen storage material may be comprised of additional ingredients, additives or structures that improve the thermal or mechanical properties of the composite. Examples include graphite flakes, carbon fibers, carbon nanofibers, carbon nanotubes, polymer fibers, thermal conductive materials, a metal honeycomb/lattice, metal fibers, wire, metal particles, glass fibers, and combinations thereof. Examples of thermally conductive materials are aluminum foil, aluminum honeycomb, aluminum powder, carbon fibers, carbon flakes and similar materials. Examples of structural additives include carbon flakes, carbon nanotubes, fibers of fiberglass, carbon fibers, carbon nanofibers and combinations thereof. A lubricant may be an example of an additive. A portion of the composite hydrogen storage material may optionally be removed during manufacture in order to expose such additional materials as thermally conductive materials and structural additives for example.

Additionally, an adsorbent or absorbent material can be added to the composite hydrogen storage material. The adsorbent or absorbent material may adsorb or absorb materials toxic to the active ingredient or that may interfere with the hydriding/dehydriding process. Some examples may include activated carbon, calcium oxide, other metals that readily oxidize, or 'oxygen getters'.

Optionally, a fire retardant may be added to the composite hydrogen storage material. Suitable specific fire retardants include, e.g., phosphonium ammonium borate (i.e., phospho-ammonium boron); 3,4,5,6-dibemzo-1,2-oxaphosphane-2-oxide or 9,10-dihydro-9-oxa-10-phospaphenanthrene-10-oxide (OPC) [CAS Registry Number 35948-25-5]; sulfamic acid monoammonium salt (ammonium sulfamate) [CAS Registry Number 7773-06-0]; di-n-butyltin oxide (DBTO) [CAS Registry Number 818-08-6]; di-n-octyltin oxide (DOTO) [CAS Registry Number 780-08-6]; dibutyltin diacetate di-n-butyltin diacetate (NS-8) [CAS Registry Number 1067-33-0]; dibutyltin dilaurate di-n-butyltin dilaurate (Stann BL) [CAS Registry Number 77-58-7]; ferrocene; iron pentacarbonyl; ammonium sulfate; ammonium phosphate; zinc chloride; and combinations thereof, for example.

The following are examples of composite hydrogen storage materials and methods related thereto, according to some embodiments of the invention

EXAMPLE 1

5 grams $LaNi_5$ powder with a particle size of about 1 micron or less is mixed with 0.2 grams of Atofina's 2851 kynarflex (Polyvinylidiene fluoride derivative) grade thermoplastic powder with a particle size of about 0.1 micron or less. The mixture is compression molded at about 100 MPa and 165° C. in a mold of the desired shape. The mold is then cooled to room temperature while maintaining the 100 MPa of compression pressure. The resulting part released from the mold is a porous solid composite with about 28% porosity, a mass of 5.2 grams, a specific gravity of about 5.2, and a $LaNi_5$ packing factor of about 60%.

EXAMPLE 2

5 grams $LaNi_5$ powder with a particle size of about 1 micron or less is mixed with 0.2 grams of graphitic flakes with a particle size of about 1-10 microns and with 0.2 grams of Atofina's 2851 kynarflex (Polyvinylidiene fluoride derivative) grade thermoplastic powder with a particle size of about 0.1 micron or less. The mixture is compression molded at 100 MPa and 165° C. in a mold of the desired shape. The mold is then cooled to room temperature while maintaining the about 100 MPa of compression pressure. The resulting part released from the mold is a porous solid composite with about 28% porosity, a mass of 5.4 grams, a specific gravity of about 5.0, and a $LaNi_5$ packing factor of about 56%. The addition of the graphitic flakes increases the strength and thermal conductivity of the composite solid. These improved properties are beneficial to improve the rate of hydrogen charging and the structural integrity of the part.

EXAMPLE 3

5 grams $LaNi_5$ powder with a particle size of about 1 micron or less is mixed with 0.2 grams of Polyparaphenylene terephthalamide (Kevlar) fibers about 10-20 microns in diameter/about 1-2 mm long and with 0.2 grams of Atofina's 2851 kynarflex (Polyvinylidiene fluoride derivative) grade thermoplastic powder with a particle size of about 0.1 micron or less. The mixture is compression molded at about 100 MPa and 165° C. in a mold of the desired shape. The mold is then cooled to room temperature while maintaining the 100 MPa of compression pressure. The resulting part released from the mold is a porous solid composite with about 28% porosity, a mass of 5.4 grams, a specific gravity of about 4.9, and a $LaNi_5$ packing factor of about 53%. The addition of the Polyparaphenylene terephthalamide fibers increases the strength of the composite material

EXAMPLE 4

5 grams $LaNi_5$ powder with a particle size of about 1 micron or less is mixed with 0.2 grams of activated carbon with a particle size of about 1-10 microns and with 0.2 grams of Atofina's 2851 kynarflex (Polyvinylidiene fluoride derivative) grade thermoplastic powder with a particle size of about 0.1 micron or less. The mixture is compression molded at 100 MPa and 165° C. in a mold of the desired shape. The mold is then cooled to room temperature while maintaining the about 100 MPa of compression pressure. The resulting part released from the mold is a porous solid composite with about 28% porosity, a mass of 5.4 grams, a specific gravity of about 4.8, and a $LaNi_5$ packing factor of about 52%. The activated carbon serves to adsorb harmful compounds that may otherwise contaminate the metal hydride during charging.

Figure 2:
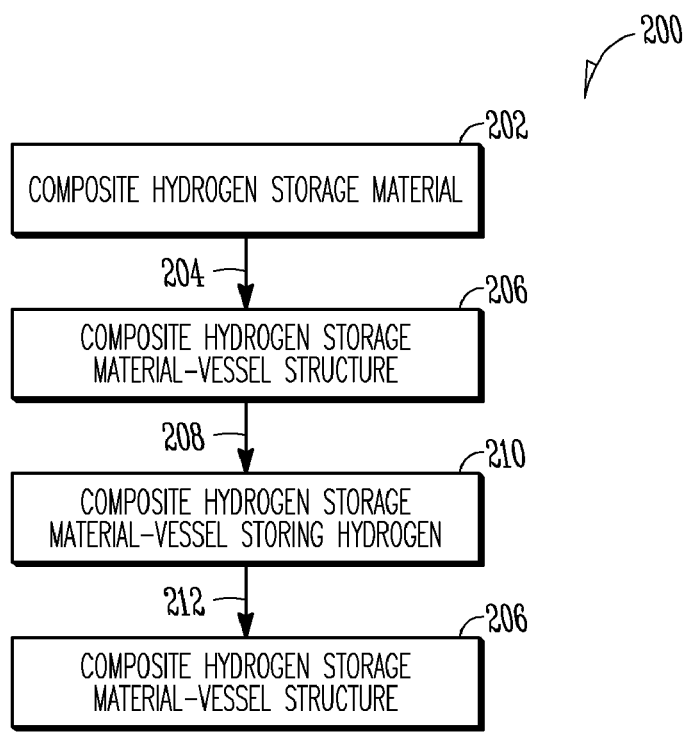
FIG. 2 illustrates a block flow diagram of a method to occlude and desorb hydrogen using a composite hydrogen storage material, according to some embodiments of the invention.

Referring to FIG. 2, a block flow diagram of a method 200 to occlude and desorb hydrogen using a composite hydrogen storage material is shown, according to some embodiments of the invention. A composite hydrogen storage material 202 may be placed in a storage vessel 204 to create a composite hydrogen storage material-vessel structure 206. Hydrogen may be occluded 208 onto or within a composite hydrogen storage material-vessel structure 206 sufficient to produce a composite hydrogen storage material-vessel structure storing hydrogen 210. The hydrogen may be desorbed 212, which readies the composite hydrogen storage material-vessel structure 206 for another cycle of hydrogen absorption/desorption. The absorption/desorption of hydrogen may be repeated numerous times, up to about 10,000, or up to about 100,000 for example, depending on the hydride material used.

A composite hydrogen storage material 202 may be placed in a storage vessel 204, such as a tank or container. As an example, the composite hydrogen storage material 202 may be utilized in a cellular fuel tank such as discussed in Zimmermann, U.S. Provisional Patent Application Ser. No. 60/757,782, entitled "CELLULAR RESERVOIR AND METHODS RELATED THERETO," filed Jan. 9, 2006, and in Zimmermann, U.S. patent application Ser. No. 11/621,501, entitled "CELLULAR RESERVOIR AND METHODS RELATED THERETO," filed Jan. 9, 2007, and published as US Patent Pub. 2007/0178335, the disclosures of which are incorporated herein by reference in their entirety.

Because of its structural strength in solid form, the composite hydrogen storage material 202 serves the dual function of storing hydrogen and also of holding the hydrogen storage particles in a fixed relative spatial relationship. Therefore, the function of resisting the strain induced by the charging of hydrogen onto the material is fulfilled entirely by the composite hydrogen storage material. As a result, the vessel for storing the hydrogen 210 need be designed to resist only the gas pressure of the system.

Figure 3:
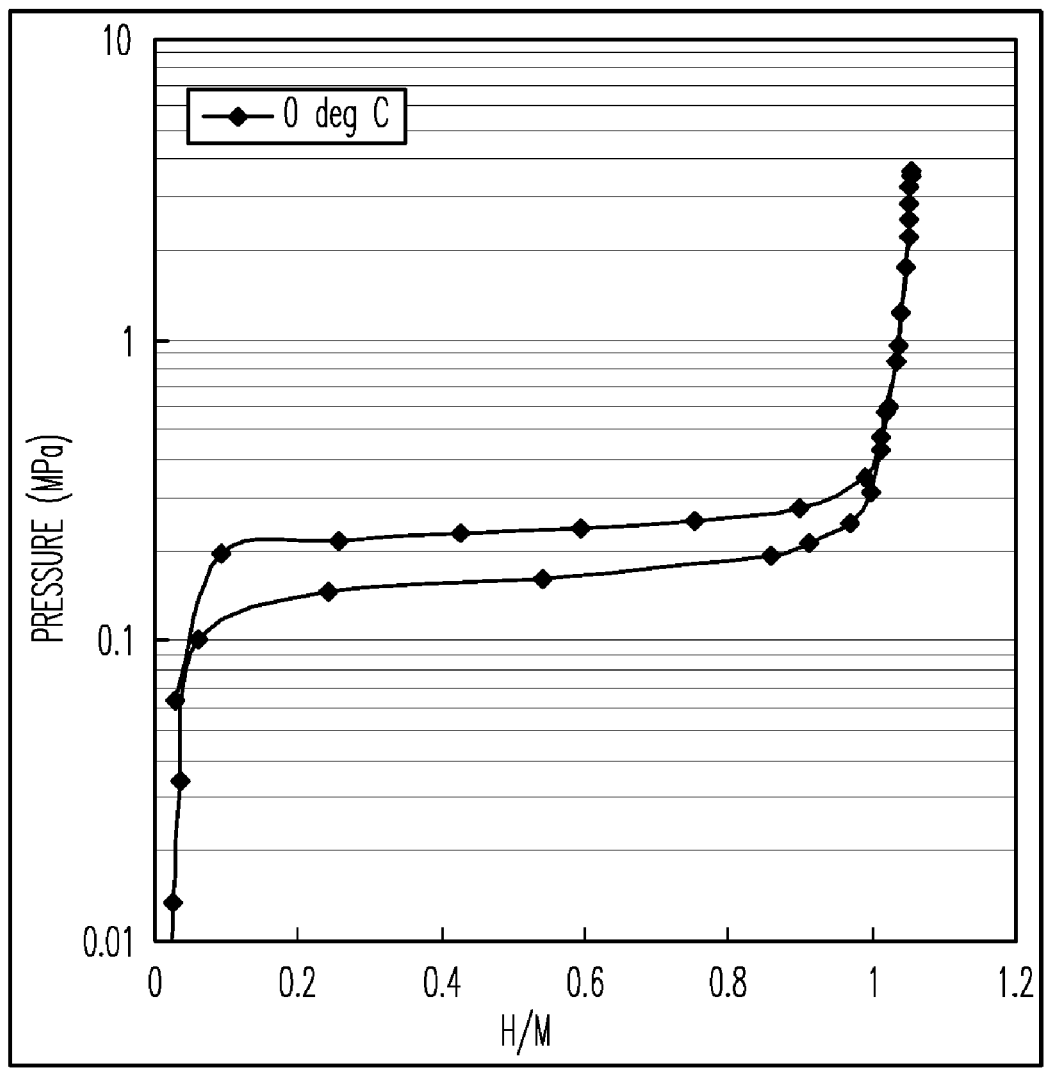
FIG. 3 illustrates a graphical view of the pressure-composition-temperature (PCT) profile of a hydriding/dehydriding cycle of an exemplary metal hydride hydrogen storage material, that may be used in some embodiments of the invention.

Referring to FIG. 3, a graphical display of the absorbing/desorbing characteristics of an exemplary hydrogen storage material within a storage vessel is shown. FIG. 3 shows a graphical view of the pressure-composition-temperature (PCT) profile of a hydriding/dehydriding cycle of a metal hydride hydrogen storage material, such as one which may be used in some embodiments of the invention.

Figure 4:
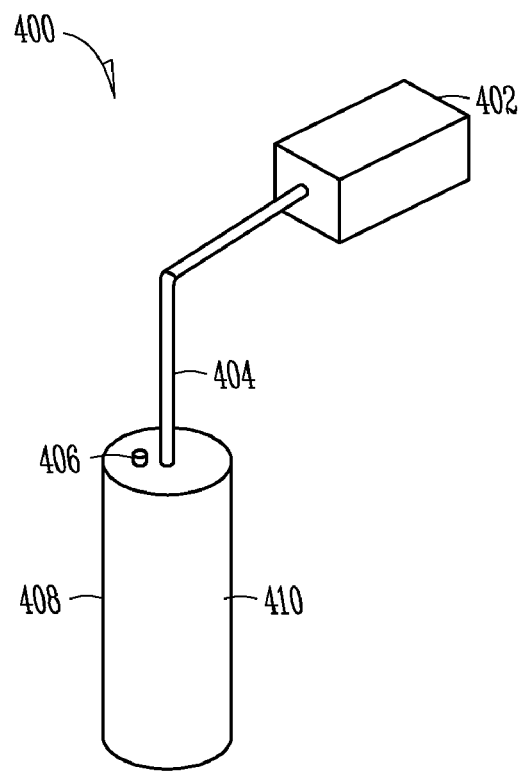
FIG. 4 illustrates a perspective view of a storage vessel utilizing a composite hydrogen storage material in communication with a device, according to some embodiments of the invention.

Referring to FIG. 4, a perspective view of a storage vessel utilizing a composite hydrogen storage material in communication with a device 400 is shown, according to some embodiments of the invention. The storage vessel 410 comprises an external wall 408, an optional pressure relief functionality 406, and port 404 in which to communicate with an external device 402. The optional pressure relief functionality 406 may be a pressure relief mechanism, such as a valve, a spring loaded-valve, a fusible trigger, a rupture disk, a diaphragm, or a vent feature, which may be integral to a tank. The port 404 may be a sealable port, for example. The external device may be a fuel cell system, a hydrogen source, a heat pump, a hydrogen compressor, or air conditioning system, for example. External device 402 may also be a gas management device, such as a regulator, check valve, on/off valve or other interconnection, for example. Alternatively, a portion of one of the exterior walls 408 may comprise a fuel cell layer, fuel cell system, a hydrogen source, a heat pump or a hydrogen compressor, for example.

When used in conjunction with a fuel cell, it is possible to create a compact system for powering portable electronic devices. Some examples of portable electronics for use with the fuel cell include, but are not limited to, cellular phones, satellite phones, laptop computers, computer accessories, displays, personal audio or video players, medical devices, televisions, transmitters, receivers, lighting devices including outdoor lighting or flashlights, electronic toys, or any device conventionally used with batteries.

The storage vessel 410 may be of a small size and the optional pressure relief functionality 406 may be integrated into the design of the storage vessel 410. For larger storage vessels 410, a pressure activated relief device or temperature activated relief device may be usable. The activation temperature range may be from about 150° C. to about 400° C. for a temperature activated relief device. For a pressure activated relief device, the activation pressure may be from about 200 to about 1000 psi, but will depend on the thickness and strength of the storage vessel 410 walls.

Figure 5:
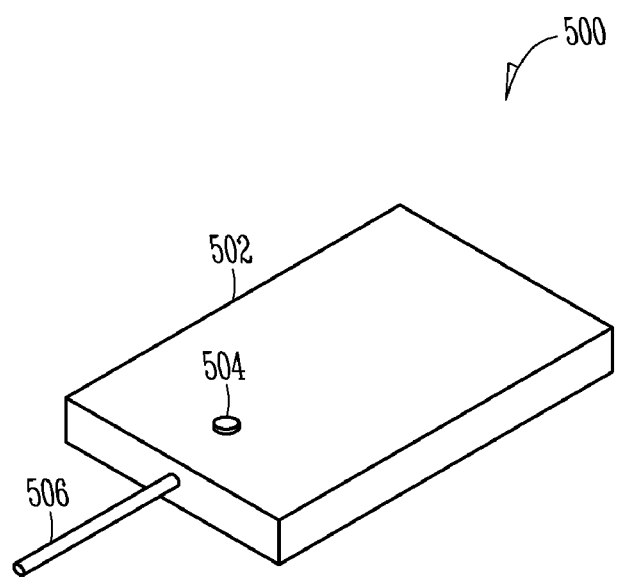
FIG. 5 illustrates a perspective view of a storage vessel utilizing a composite hydrogen storage material, according to some embodiments of the invention.

Referring to FIG. 5, a perspective view of a storage vessel 500 utilizing a composite hydrogen storage material is shown, according to some embodiments of the invention. The storage vessel 500 comprises an optional pressure relief functionality 504 and port 506. Pressure relief functionality 504 is optional and may be eliminated from the design of the storage vessel, particularly when the vessel is very small, or has been designed with an integral feature to fail while allowing reasonably safe relief of internal pressure. The port 506 may be used to communicate with any number of external devices (not shown in figure).

Figure 6:
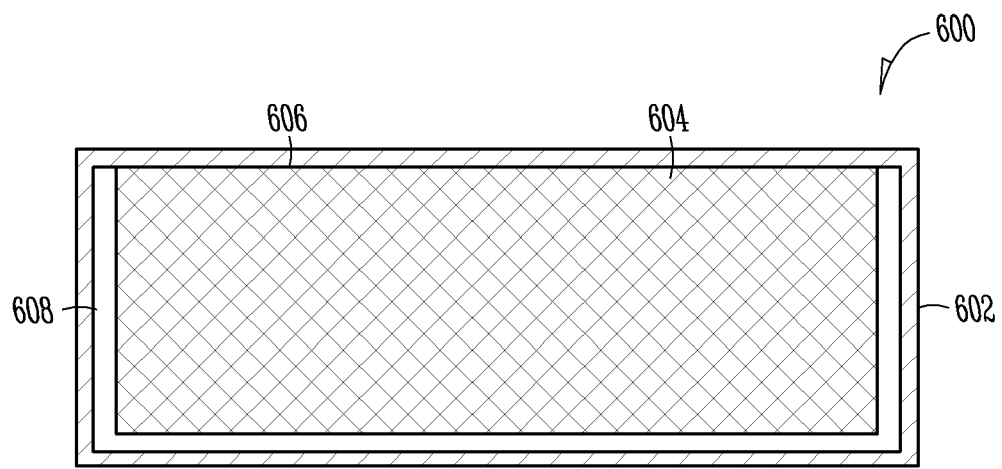
FIG. 6 illustrates a cross-sectional view of a storage vessel utilizing a composite hydrogen storage material disposed on an interior wall, according to some embodiments of the invention.

Referring to FIG. 6, a cross-sectional view of a storage vessel 600 utilizing a composite hydrogen storage material disposed on an interior wall is shown, according to some embodiments of the invention. The storage vessel 600 comprises an interior wall 606 and exterior wall 602. A composite hydrogen storage material 604 may be disposed within the interior wall 606, creating a space 608 between the composite hydrogen storage material 604 and interior wall 606. The composite hydrogen storage material 604 may be in the form of matrix which may utilize a melt processible polymer, for example polyvinylidene fluoride, polyethylene or polypropylene, as the binder. The matrix may partially or entirely fill the interior space of the storage vessel 600.

The composite hydrogen storage material 604 may be optionally adhered to at least a portion of at least one of the interior walls 606 of the storage vessel 600. The composite hydrogen storage material 604 may be adhered using a melt processible polymer, for example. Alternatively, adhering may be performed by gluing the composite hydrogen storage material 604 to at least a portion of at least one of the interior walls 606. An example of glue that may be utilized is an epoxy adhesive or a silicone adhesive, for example.

Figure 7:
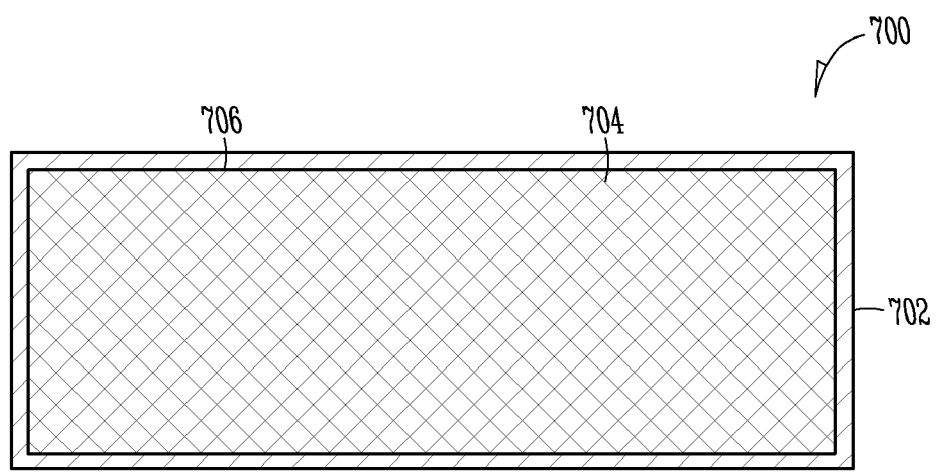
FIG. 7 illustrates a cross-sectional view of a storage vessel utilizing a composite hydrogen storage material as a matrix substantially filling the storage vessel, according to some embodiments of the invention.

Referring to FIG. 7, a cross-sectional view of a storage vessel 700 utilizing a composite hydrogen storage material as a matrix substantially filling the storage vessel is shown, according to some embodiments of the invention. The storage vessel 700 comprises an interior wall 706 and exterior wall 702. A composite hydrogen storage material 704 may be disposed as a matrix within the interior wall 702, substantially filling the storage vessel 700.

Figure 8:
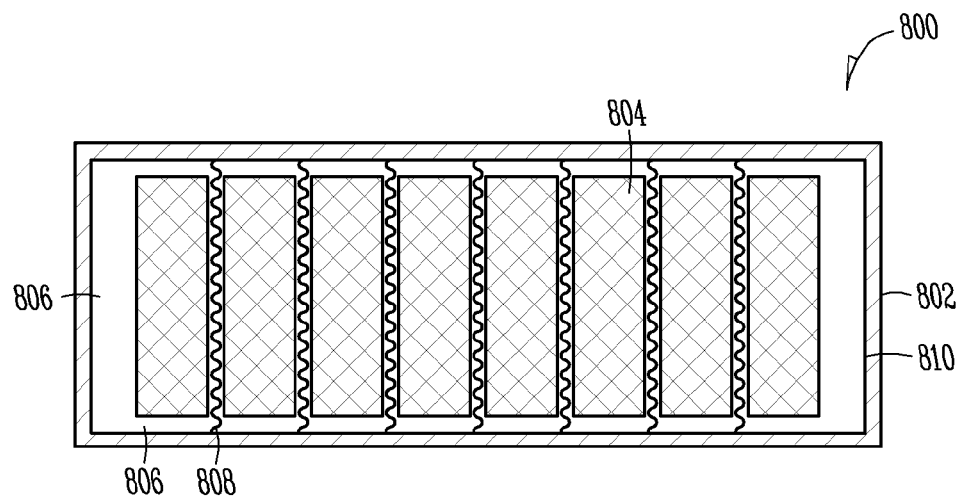
FIG. 8 illustrates a cross-sectional view of a storage vessel a composite hydrogen storage material as a plurality of layers in a matrix within the storage vessel, according to some embodiments of the invention.

Referring to FIG. 8, a cross-sectional view of a storage vessel 800 utilizing a composite hydrogen storage material as a plurality of layers in a matrix within the storage vessel is shown, according to some embodiments of the invention. The storage vessel 800 comprises an interior wall 810 and exterior wall 802. A composite hydrogen storage material 804 can be disposed as a plurality of layers within the interior wall 802, creating spaces 806. Between each layer of the composite hydrogen storage material 804, may be placed an optional conductive member 808. During the manufacture of the composite hydrogen storage material 804, portions of the structure may be removed in order to expose a conductive member 808.

For example, a storage vessel 800 may be filled with composite hydrogen storage material 804 so that storage vessels 800 of differing sizes may be built up from the same basic element. This would allow for the placement of composite hydrogen storage material 804 with other materials inside the storage vessel 800, i.e. placing heat conducting members around the composite hydrogen storage material 804, as shown. Some of the material may then be removed to expose parts of the composite 804 that have particular characteristics, such as exposing heat conducting members 808 embedded within the material.

Figure 9:
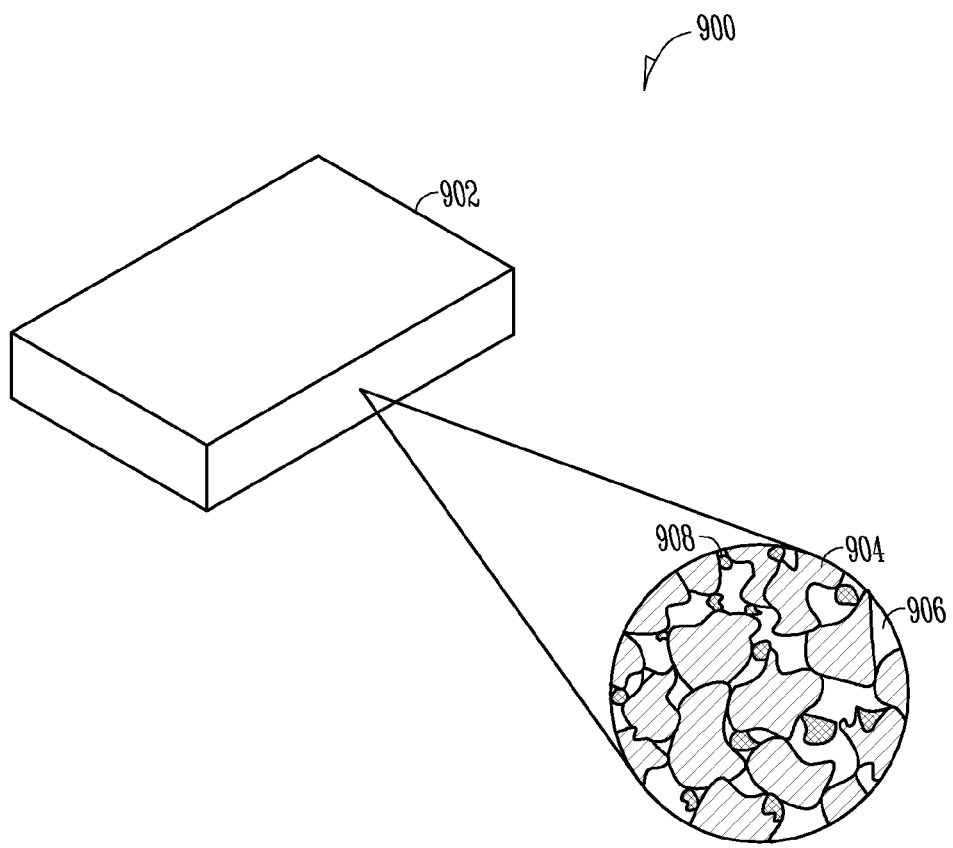
FIG. 9 illustrates a perspective view of a composite hydrogen storage material structure, according to some embodiments of the invention.

Referring to FIG. 9, a perspective view of a composite hydrogen storage material structure 900 is shown, according to some embodiments of the invention. A composite hydrogen storage material structure 900 can be formed in such shapes as a rectangular wafer 902, for example. The cross-sectional cut out illustrates the interaction of active material 904, such as a metal hydride, and binder 908, which may create one or more interstitial spaces or voids 906. The spaces 906 allow for hydrogen diffusion and flow through the active material, such as metal hydride particles so that hydrogen is able to reach the interior of the formed composite hydrogen storage material.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of using a composite hydrogen storage material, the method comprising:
   occluding hydrogen onto or within a composite hydrogen storage material, wherein the composite hydrogen storage material includes
   active material particles; and
   a binder;
   wherein the binder elastically immobilizes the active material particles sufficient to maintain relative spatial relationships between the active material particles before, during, and after any occluding and desorbing of hydrogen and wherein the composite hydrogen storage material is capable of withstanding a force produced by a particle strain during occlusion and desorption of hydrogen by the active material particles sufficient to provide a load bearing member independently or within a storage vessel; and
   desorbing hydrogen from the composite hydrogen storage material.

2. The method of claim 1, further comprising after desorbing hydrogen, occluding hydrogen onto or within a composite hydrogen storage material a second time.

3. The method of claim 2, further comprising after occluding hydrogen onto or within a composite hydrogen storage material a second time, desorbing hydrogen from the composite hydrogen storage material a second time.

4. The method of claim 3, further comprising after desorbing hydrogen from the composite hydrogen storage material a second time, occluding hydrogen and desorbing hydrogen three or more times, up to about 100,000 times.

5. The method of claim 4, wherein the active material particles substantially maintain spatial relationships between the active material particles during the occluding hydrogen and desorbing hydrogen up to about 100,000 times.

6. The method of claim 1, wherein the composite hydrogen storage material further includes one or more additives.

7. The method of claim 1, wherein the composite hydrogen storage material further includes a thermally conductive additive.

8. The method of claim 7, wherein the thermally conductive additive comprises aluminum, graphite flakes, graphite fibers, or a combination thereof 9. The method of claim 1, wherein the composite hydrogen storage material further includes an adsorbent additive.

10. The method of claim 9, wherein the adsorbent additive is capable of adsorbing materials that can interfere with a hydrogen storing function of the active material particles.

11. The method of claim 10, wherein the adsorbent additive comprises activated carbon.

12. The method of claim 1, wherein the composite hydrogen storage material further includes a structural additive.

13. The method of claim 12, wherein the structural additive is selected from the group of carbon flakes, carbon nanotubes, fibers of fiberglass, carbon fibers, carbon nanofibers and combinations thereof.

14. The method of claim 1, wherein the composite hydrogen storage material further includes a fire retardant.

15. The method of claim 1, wherein the composite hydrogen storage material further includes a lubricant.

16. The method of claim 1, wherein the binder is a thermoplastic binder.

* * * * *